US006161159A

United States Patent [19]

Suzuki

[11] Patent Number: 6,161,159

[45] Date of Patent: *Dec. 12, 2000

[54] MULTIMEDIA COMPUTER WITH INTEGRATED CIRCUIT MEMORY

[75] Inventor: Kazumasa Suzuki, Tokyo, Japan

[73] Assignee: NEC Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/936,918

[22] Filed: Sep. 25, 1997

[30] Foreign Application Priority Data

Sep. 27, 1996 [JP] Japan .................................... 8-256176

[51] Int. Cl.$^{7}$ ............................ G06F 12/04; G06F 13/40

[52] U.S. Cl. ............................ 710/127; 710/26; 712/21; 712/23

[58] Field of Search ............................ 710/127, 26, 25, 710/27; 712/21, 23; 365/185.21, 185.19; 708/518; 348/699, 402; 711/144, 121; 341/67, 65

[56] References Cited

U.S. PATENT DOCUMENTS

| | | | |
|---|---|---|---|
| 5,218,569 | 6/1993 | Banks | 365/185.21 |
| 5,283,886 | 2/1994 | Nishii et al. | 711/144 |
| 5,319,395 | 6/1994 | Larky et al. | 345/515 |
| 5,329,318 | 7/1994 | Keith | 348/699 |
| 5,541,595 | 7/1996 | Meyer | 341/67 |

FOREIGN PATENT DOCUMENTS

| | | |
|---|---|---|
| 3-122744 | 5/1991 | Japan . |
| 4-82082 | 3/1992 | Japan . |
| 5-41804 | 2/1993 | Japan . |
| 6-53840 | 2/1994 | Japan . |
| 6-152435 | 5/1994 | Japan . |

*Primary Examiner*—Daniel H. Pan
*Attorney, Agent, or Firm*—Sughrue, Mion, Zinn, Macpeak & Seas, PLLC

[57] ABSTRACT

An alternate route to improved multimedia performance without replacing the central processor unit (CPU) is presented, through the utilization of general-purpose components available in a computer. The method relies on the use of integrated circuit memory boards having a data port for directly inputting encoded image signals from an I/O device into the memory. An on-board decoder provided on the IC memory is used to decode the variable-length encoded input signals. This approach enalbes to reduce the computational load on the CPU so that the usual bottleneck which is the slow process of data exchange between the CPU and the memory boards is eliminated. The CPU directly accesses the processed image data in the memory and displays the final image on the monitor. This route to increasing the image processing speed of a computer has considerable merits because it is low cost and is readily applicable to mass-produced IC memories with only a few additional fabrication steps.

16 Claims, 12 Drawing Sheets

MULTIMEDIA COMPUTER WITH INTEGRATED CIRCUIT MEMORY

BACKGROUND OF THE INVENTION

1. Field of the Invention

The present invention relates in general to highspeed computers, and relates in particular to a computer for processing a large volume of data such as image data and other multimedia applications, and an integrated circuit memory designed for improved speed of processing to be used with the computer.

2. Description of the Related Art

An example of the configuration of a conventional small computer is shown in FIG. 8. Mathematical computation and signal processing are performed by combined actions of a microprocessor 1 connected to the main memory 2 by way of a bus•memory controller 3. Input data are supplied from an input/output (I/O) device 5, through a system bus 7, to the bus•memory controller 3. The I/O device 5 is connected to a communication port (comport) 8, and performs data transmitting and receiving tasks for the communication circuit and the computer.

The I/O device 5 is connected with secondary memory devices 10, such as hard disk and floppy disk, and input devices 11 such as a keyboard and a mouse. The results of computations generated by the microprocessor 1 are supplied, through the system bus 7, to the video controller 4, and are stored in a frame buffer 9. The data stored in the frame buffer 9 are displayed in real time on a monitor 6 under the control of the video controller 4. The frame buffer is a type of (semiconductor) memory for storing current data.

FIG. 9 shows another example of the system configuration of a conventional computer. In this example, instead of storing the data in the frame buffer 9 connected to the video controller 4, the current image data are stored in a section of the main memory 2. The components other than the frame buffer, such as input section and computation section, are the same as those shown in FIG. 8. The cost of the system is reduced because of lesser number of required component parts.

The circuit components used for main memory 2 and frame buffer 9 are integrated circuits, such as the one shown schematically in FIG. 10. The data are stored in memory cell array 20 comprised by several mega bits to several tens of mega bits of memory cells. A memory cell is specified by an address in the memory cell array. An address is given in the binary notation from the address port 27, and an address decoder 21 is used to specify a memory cell or a group of memory cells. Data are written into the memory cells from the data port 26, by way of a buffer 23. The contents of the memory are read by the sense amplifier 22, and are output to the data port.

To improve the output speed of the video data, a dedicated integrated circuit, a video RAM, is sometimes used for the frame buffer. As illustrated in FIG. 11, such an IC memory stores a group of data read out by the sense amplifier 22 in the data buffer 32, and reads the data from the data buffer 32 one bit at a time from the data port 26' according to an address signal prompted by a counter 33 operating at the clock frequency generated by clock input means 34. The data port 26' serves as the data output terminal to the monitor 6.

As shown in FIG. 12, a computer system having a dedicated video memory is assembled so that the monitor 6 is connected to the frame buffer 9 by way of an digital-to-analogue converter (D/A converter) 12. Incidentally, normally an D/A converter 12 is included in the video controller 4, but the D/A converter 12 is shown separately from the video controller 4 in FIG. 12, because such an integral dedicated memory has a separate video output port, as in the example in FIG. 12.

There is much demand for decompressing of compressed image data for display, because of the significantly high volume of data signals required for image processing, and high signal processing performance is requested.

The process of decompressing the compressed image data signals, according to specifications by Motion Picture Engineers Graphics (MPEG), will be explained with reference to a flowchart shown in FIG. 13. The image signals delivered from a communication circuit or a recording medium are separated into image data component, motion vector components and quantizer indexes, in the signal separation task 50. The image data are already encoded into variable-length words according to such methods as Huffman encoding, for example, and are decoded in the variable-length word decoding task 51. In the reverse quantization processing task 52 which follows, the original signals are restored using the quantizer table. The quantizer table is included in the delivered signals, and are separated during the process of signal separation. Afterwards, in the inverse quantization cosine conversion (DCT) task 53, the frequency components are converted to real space components. At this stage, frame-to-frame sequence data are processed using the motion vector (obtained in the signal separation task 50) in the motion compensation task 56, and then the sequence data are added in the adder 54 to the image data processed by the DCT processing task 53, to restore the original images. Finally, the rearranging processing task 55 rearranges the image data in the chronological sequence, to restore the true image data from the compressed image data. The restored data are delivered, as new image data, to the image accumulation processing task 57 and form the basis for compensating the next image movement.

In the computers shown in FIGS. 8, 9 and 12, the image processing is performed as follows. First, image data are input from the com port 8, by way of the I/O device 5, system bus 7, and bus•memory controller 3, to be stored in the main memory 2. The necessary portions of the image data in the main memory 2 are written into the microprocessor 1 and the series of processes depicted in FIG. 13 are performed. The final image data are stored in the main memory 2 to be ready for the image accumulation task 57 and image rearranging task 55 (refer to FIG. 13), as well as being written into the frame buffer 9, by way of the bus•memory controller 3 and the video controller 4. The data in the frame buffer 9 are displayed on the monitor 6 under the control of the video controller 4. During the image processing process, various tasks such as reading out necessary data from the main memory and writing data temporarily into the main memory continue to be performed. The programs necessary to perform such tasks are also stored in the main memory, and necessary sections of the program are read into the microprocessor while the image processing processes are being carried out.

The image data are handled in units called a macro-block comprised roughly by 8×8 pixels, and are processed as an 8-bit matrix. The reverse quantizer task 52 and the reverse DCT task 53 are performed in matrix multiplications, and the signal addition task 54 performs matrix additions. These operations are performed by repeating the same types of computations, and computations can be made faster by using parallel processing devices. Recently, microprocessors having parallel processing pipelines are being applied to computers to enhance their image processing capability.

In the meantime, the variable-length encoding task 51 compares input data with the table and converts the input data to corresponding data. Because the bit length in the table are different depending on the encoding mode, it is not possible to find the start of the next word unless the previous word has been decoded. Therefore, the input signals must be examined serially, and consequently, they are not amenable to parallel processing. It can not be anticipated, therefore, that speed enhancement in the variable-length encoding process can be achieved through the use of parallel processing devices.

A review of the existing technology reveals a number of serious performance problems outlined in the following.

The first problem is that, in the conventional image processing technology, a microprocessor and memories are constituted by separate independent integrated circuits, and a bottleneck in the processing speed occurs in the slow process of data exchange between these two components of the computer system.

The reason is that, while independently configured ICs of the microprocessor and memories are needed to exchange a large volume of data for image processing need arising from pre-processing, intermediate processing and post-processing tasks, there is a limit to the number of I/O ports which can be provided in any given IC, so that the volume of data which can be exchanged to and from the IC is also limited.

The second problem is that, in the conventional computers, volume of image data which must be handled in a series of operations can sometimes be beyond the processing capacity of a given type of microprocessor.

The reason is that, although efforts are being made to provide an increased speed of processing by installing parallel processors to handle such tasks as reverse quantization process which are amenable to parallel processing, it is not possible to carry out decoding for the variable-length encoded words in a parallel processing device so that the rate of processing cannot be accelerated.

The third problem is that when the performance of the conventional image processing computers are improved, there is a tendency for the computer system to become higher priced.

The reason is that, because new devices, such as coprocessors, are added to the system, the price is increased by the cost of the added devices. Furthermore, if the low cost standardized components produced by mass production cannot be used for the revised computer system by adding the new devices, opportunity for reducing the system cost becomes severely limited.

Therefore, it is obvious that there is a need for a computer, using the capabilities of the standardized components, that can be produced at low cost and yet offers high image processing ability to handle a large volume of data.

SUMMARY OF THE INVENTION

It is an object of the present invention to provide a computer that can process a large volume of data, such as image data, at high processing speeds.

It is another object of the present invention to reduce the volume of data which must be processed by a microprocessor in processing a large volume of data such as image data.

It is still another object of the present invention to provide an image processing system that can operate at high processing speeds, without significantly altering the computer system configuration, by using existing standardized component parts.

The object has been achieved in a computer system comprising main memory means having an access port for a microprocessor and an input port for inputting data directly from an input/output device.

The object has also be achieved in a computer system comprising at least: a microprocessor connected to a bus•memory controller; a video controller connected to the bus•memory controller through main memory means and a system bus; and an input/output device.

An aspect of the computer system presented above is that, in addition to an access port for a microprocessor, a direct access port is provided for directly accessing the main memory means through an input/output device.

The object has been also achieved in a computer system comprising main memory means for performing functions of directly writing into the main memory means through a write port and of decoding variable-length encoded signals within the main memory means.

The object is achieved by applying to the computer system an integrated circuit memory, having a computational ability, comprising an address port for accessing by a microprocessor; a first data port; a second data port for inputting variable-length encoded signals.

An aspect of the integrated circuit memory is that a decoder for performing variable-length computational operations is provided.

An aspect of the integrated circuit memory presented above is that the decoder decodes the variable-length encoded signals, in reference to a decoding table associated with memory cells.

The object has also been achieved by applying to the computer system an integrated circuit memory, having a computational ability, comprising at least: a memory cell array; an address decoder for decoding memory cell addresses for data input from an address port; a sense amplifier for amplifying signals from memory cells; and a write-buffer for writing data input from a first data port into memory cells; wherein a second data port is provided for inputting variable-length encoded signals.

An aspect of the integrated circuit memory presented above is that a decoder is provided for performing computations based on variable-length encoded signals.

An aspect of the integrated circuit memory presented above is that the decoder performs decoding operations in reference to a decoding table associated with memory cells.

The object has also been achieved by applying an integrated circuit memory, having a computational ability, comprising: an address port for accessing by a microprocessor; a first data port; a second data port for outputting data; and a third data port for inputting variable-length encoded signals.

An aspect of the integrated circuit memory presented above is that a decoder is provided for performing computations based on variable-length encoded signals.

An aspect of the integrated circuit memory presented above is that the decoder performs decoding operations in reference to a decoding table associated with memory cells.

The object has been achieved by applying to the computer system an integrated circuit memory, having a computational ability, comprising at least: a memory cell array; an address decoder for decoding memory cell addresses for data input from an address port; a sense amplifier for amplifying signals from memory cells; and a write-buffer for writing data input from a first data port into memory cells; wherein a second data port for outputting data and a third data port for inputting variable-length encoded signals are provided.

An aspect of the integrated circuit memory presented above is that a decoder is provided for performing computations based on variable-length encoded signals.

An aspect of the integrated circuit memory presented above is that the decoder performs decoding operations in reference to a decoding table associated with memory cells.

According to the computer system having an integrated circuit main memory of the present invention, a first advantage presented is that the volume of data that need to be exchanged between the main memory and the microprocessor has been greatly reduced. The reason is that the IC memory provided in the main memory is used to decode the variable-length encoded image data so that the need to decode, by forwarding programs and data for image data processing from the main memory to the microprocessor, has been eliminated. This portion of the overall processing task is about twenty to thirty percent, and the IC memory has enabled to eliminate almost all of the needs for this transference task.

Furthermore, a second advantage presented is that the volume of data that the microprocessor must manipulate for image processing has been reduced. The reason is that the microprocessor having a parallel onboard computation device is able to efficiently process such series of image processing tasks as quantization, reverse quantization cosine conversion and motion anticipation; however, other tasks such as variable-length decoding, that are difficult to be processed by the parallel processor, are assigned to the main memory having the IC memory of the present invention. The result of this re-assignment of responsibility is that the microprocessor is no longer called upon to perform tasks which are inefficiently processed in the microprocessor.

A third advantage presented is that an image processing computer system can be produced at a lower cost. The reason is that almost all of the component requirements in the computer system can be met by standardized component parts, thus enabling to contain the needs for increasing number of additional components.

DESCRIPTION OF THE PREFERRED EMBODIMENTS

Preferred embodiments will be presented with reference to the drawings.

Figure 1:
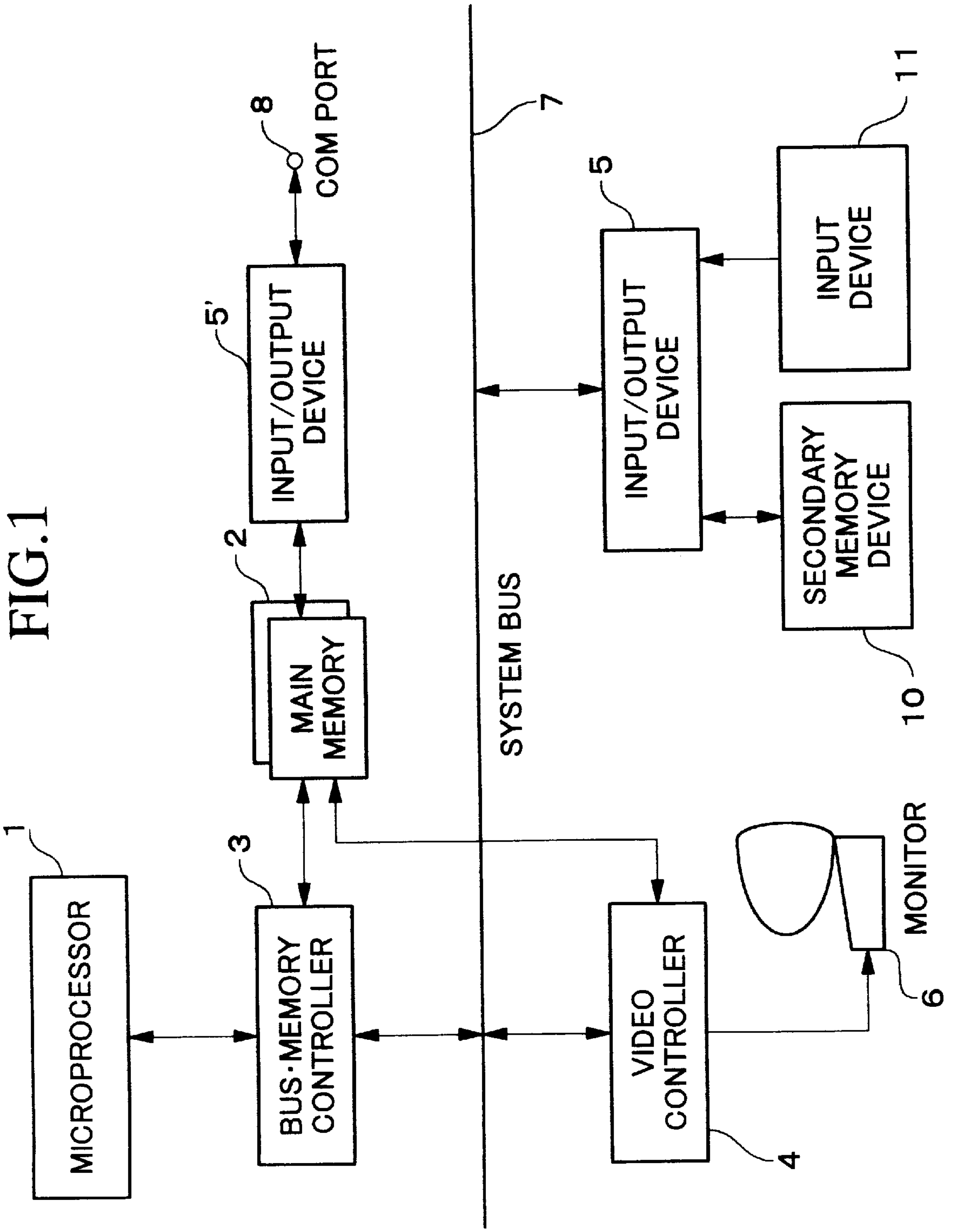
FIG. 1 is a schematic block diagram of the system configuration of an embodiment of the computer system of the present invention.

With reference to FIG. 1, a first embodiment computer system features a main memory 2 (commonly referred to as memory boards) which is provided with a separate port for connecting the I/O device 5'. The main memory 2 stores image data, application programs, and currently displayed image data. The other port on the main memory 2 is the same as the conventional port and is connected to the microprocessor 1 by way of the bus•memory controller 3. The bus•memory controller 3 is connected to the video controller 4 through the system bus 7, and the video controller 4 is connected to the main memory 2 and the monitor 6. The secondary memory 10 and input devices 11, such as keyboard, are connected to the bus•memory controller 3, micro-processor 1 and main memory 2 by way of the I/O device 5 connected to the system bus 7.

Figure 2:
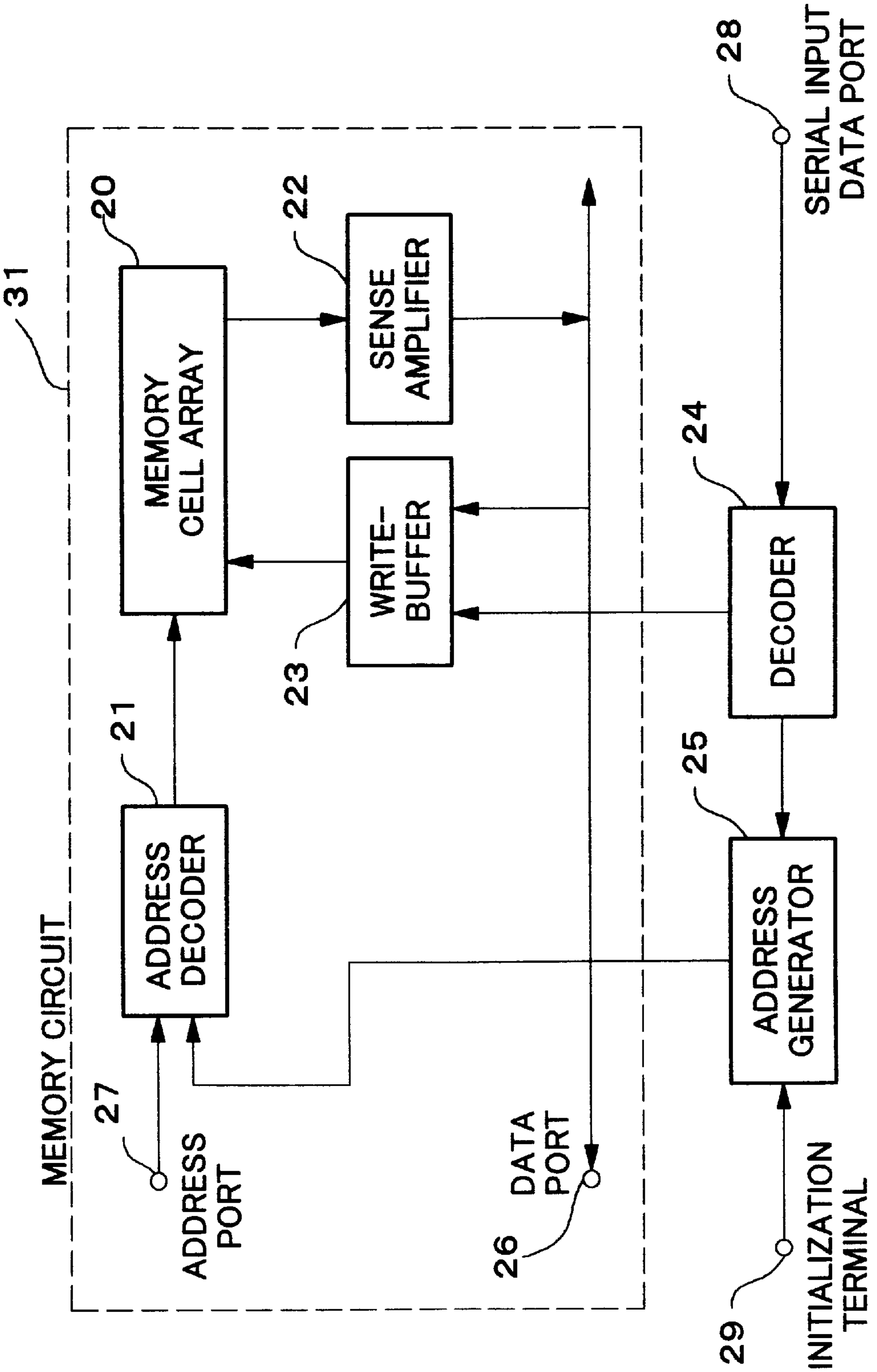
FIG. 2 is a schematic block diagram of the component configuration of the first embodiment of IC memory.

FIG. 2 shows a structure of the IC memory comprising the main memory 2 whose data port 28 is connected to the I/O device 5'. The image data input into the memory circuit 31 are decoded by a decoder 24, having a computation capability for variable-length decoding, and are written into a memory cell array 20 by way of a write-buffer 23. An address generator 25 generates write-addresses for decoded image data, and by way of the address decoder, specifies write-addresses for the memory cells. At the start of image processing, initializing signals for initializing the address generator 25 are input from the initialization terminal 29. Microprocessor 1 accesses and specifies memory cell addresses through the address port 27 and the address decoder 21, writes into the memory cells by way of the data port 26 and the write-buffer 23, and reads data at the data port 26 by way of the sense amplifier 22.

The operation of the computer system will be explained with reference to FIGS. 1 and 2. At the start of the operation, the address generator 25 in the memory circuit 31 is initialized by generating initializing signals 29 from the computer. Image signals compressed as variable-length encoded data are input from the com port 8. The image data are written into the main memory 2 of the computer by the I/O device 5', and are input into the IC memory from the data port 28 of the main memory 2. The input image data are first subjected to variable-length decoding computation by the decoder 24. The decoded image data are written, by way of the write-buffer 23, into the memory cell array 22 by the decoder 24. The decoder 24 generates a request signal to the address generator 25 for an address to write in the image data, and in response, the address generator 25 specifies a memory cell for the image data by way of the address decoder 21. In this condition, the variable-length encoded image data input from the com port 8 are decoded and written into the memory cell in variable-length words. This IC memory can be fabricated by adding a serial input data port 28 and signal control circuits, such as initialization circuit 29, to any general-purpose memory device, and consequently, what is required are some additional pins to an existing IC pattern.

The microprocessor 1 accesses the processed image data in the main memory 2 by way of the bus•memory controller 3, and performs a series of subsequent image processing tasks other than the variable-length decoding task (which is performed by the decoder 24 in main memory 2) while exchanging in-process data and final data and others between itself and the main memory 2. Therefore, it can be seen that a computer can perform all the necessary tasks in a conventional manner, excepting the variable-length decoding task. The final image data are written into the main memory 2, and are accessed by the video controller 4 to be displayed on the monitor 6.

Figure 3:
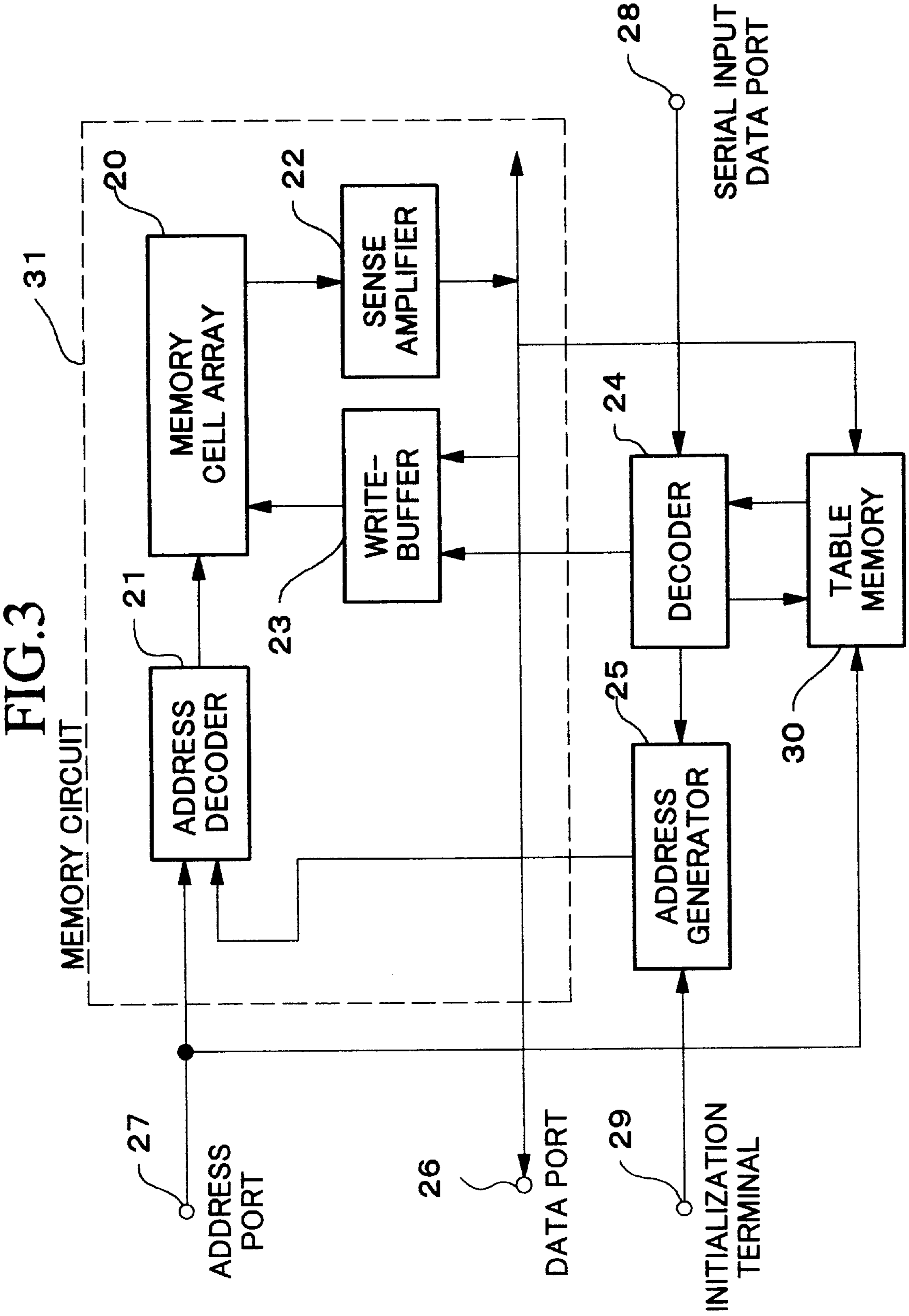
FIG. 3 is a schematic block diagram of the component configuration of another embodiment of IC memory.

FIG. 3 shows a variation of the IC memory used in the first embodiment. In this case, the decoder 24 performs decoding computations with reference to a decoding table. Prior to performing image processing, the decoding table is input and stored in a table memory 30. The table memory 30 may be derived from a part of the memory cell array 20 comprising the main memory 2 with a separate memory address or from a special memory array to be designated for the table memory 30.

The content of the decoding table are generated in the same way as the contents of regular memories accessed through the address port 27 and the data port 26. An address value for the table memory 30 input through the data port 28 allows the microprocessor 1 to read corresponding decoding script from the table memory 30 to perform a decoding operation. Because the IC memory is an integrated circuit, the table memory 30 can also be fabricated by using the same technique as making of the memory cell array 20, thus enabling to produce a table memory of a high cell density.

Figure 4:
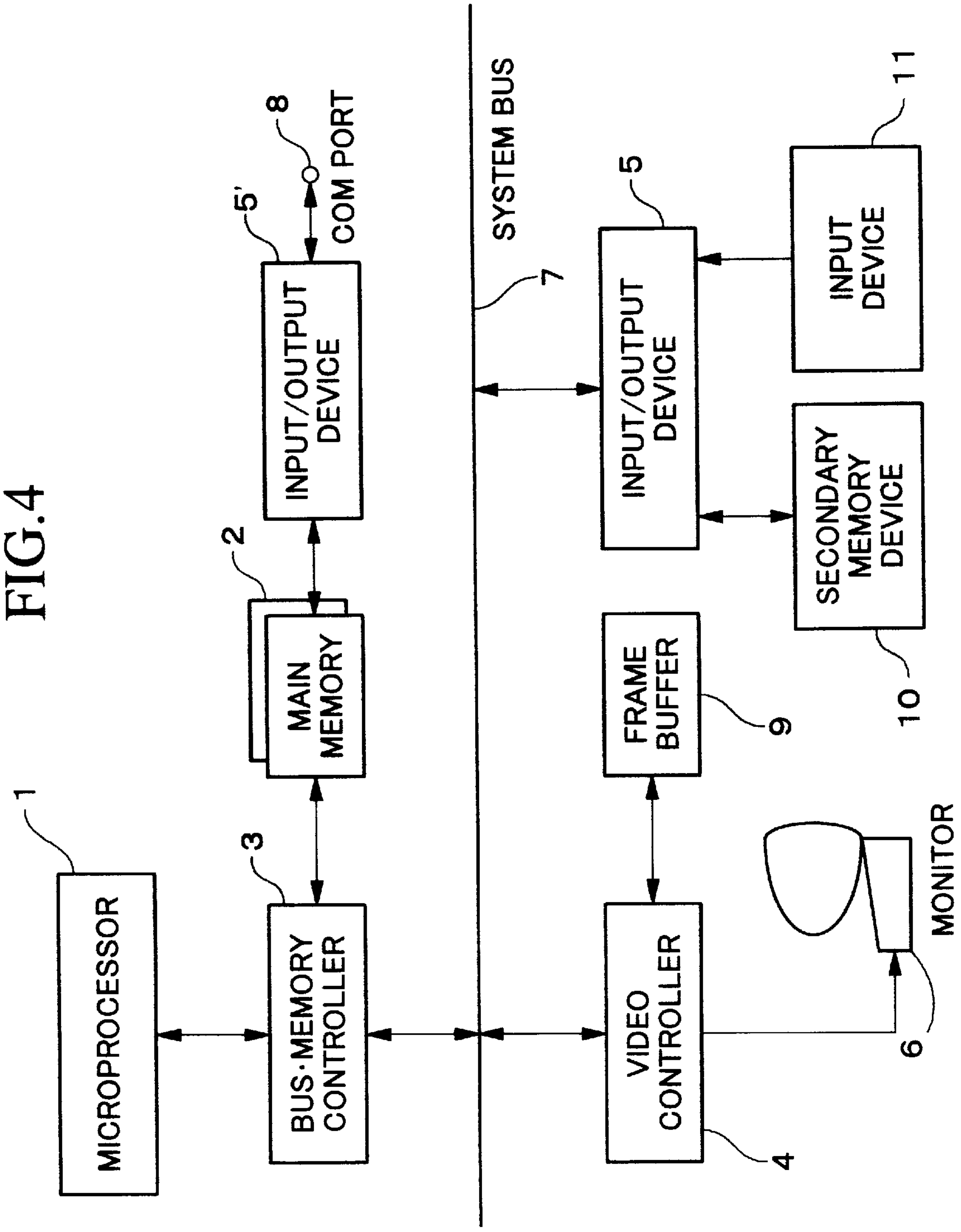
FIG. 4 is a schematic block diagram of the component configuration of still anther embodiment of the computer system of the present invention.

FIG. 4 shows an example of another system configuration by adding a frame buffer 9 to the first embodiment computer system to further enhance the performance of the image processing computer. The IC memories shown in FIGS. 2 and 3 can be used to write variable-length encoded image data into the main memory 2 through the com port 8 by way of the (basic input/output system) BIOS 5'. Microprocessor 1 accesses the main memory 2 through the bus•memory controller 3, and performs all image processing operations excepting the variable-length decoding task, and supplies the final image data to the video controller 4 and the frame buffer 9 by way of the bus•memory controller 3 and the system bus 7. The image data written into the frame buffer 9 are displayed on the monitor 6 under the action of the video controller 4.

By providing a frame buffer 9, the volume of data exchanged between the processor 1 and the main memory 2 can be reduced. This is because, to display an image, the currently scanned display data (about 30 frames per second) are read out of the main memory 2, but in this case, the microprocessor 1 accesses the scanned display data, not in the main memory 2, but in the frame buffer 9. Although the frame buffer 9 is a type of a (semiconductor) memory, but a separate buffer memory will add another component and increase the cost of the system, therefore, the frame buffer may be combined in the main memory 2 shown in FIG. 1. For example, as explained in FIG. 3, a part of the memory cell array 20 can be designated for use by the frame buffer 9 with separate addresses or a special memory cell array may be designated for use by the frame buffer 9.

Figure 5:
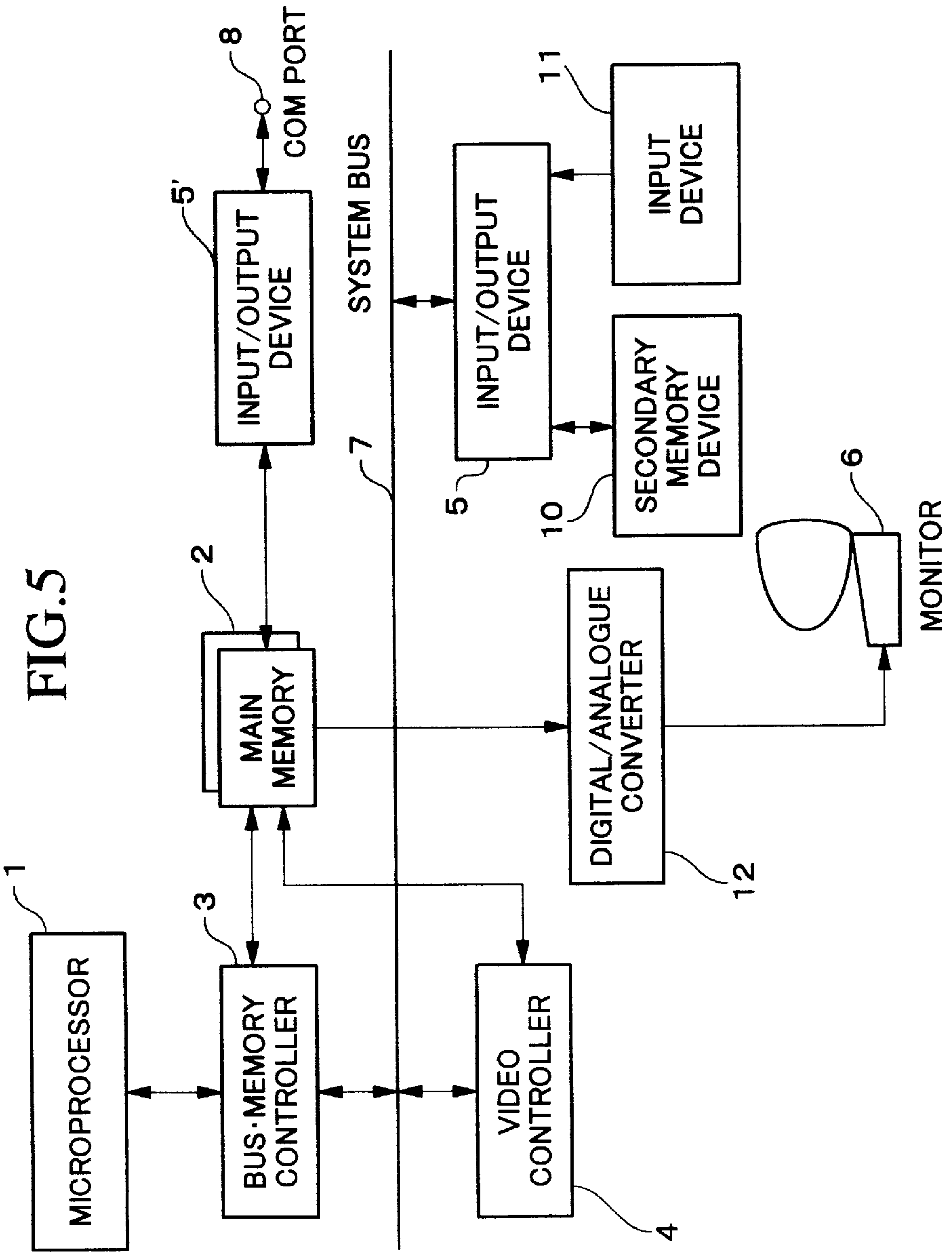
FIG. 5 is a schematic block diagram of the system configuration of still another embodiment of the computer system.

FIG. 5 is an example of providing a video output port to the main memory 2. The main memory 2 comprises a com port 8, an input port for inputting variable-length encoded image data from the I/O device 5', data exchange port connected to the micro-processor 1 through the bus•memory controller 3 for exchanging data necessary to perform image processing task excepting the variable-length decoding tasks and a monitor port for displaying processed image data on the monitor 6 by way of a digital/analogue converter 12.

Figure 6:
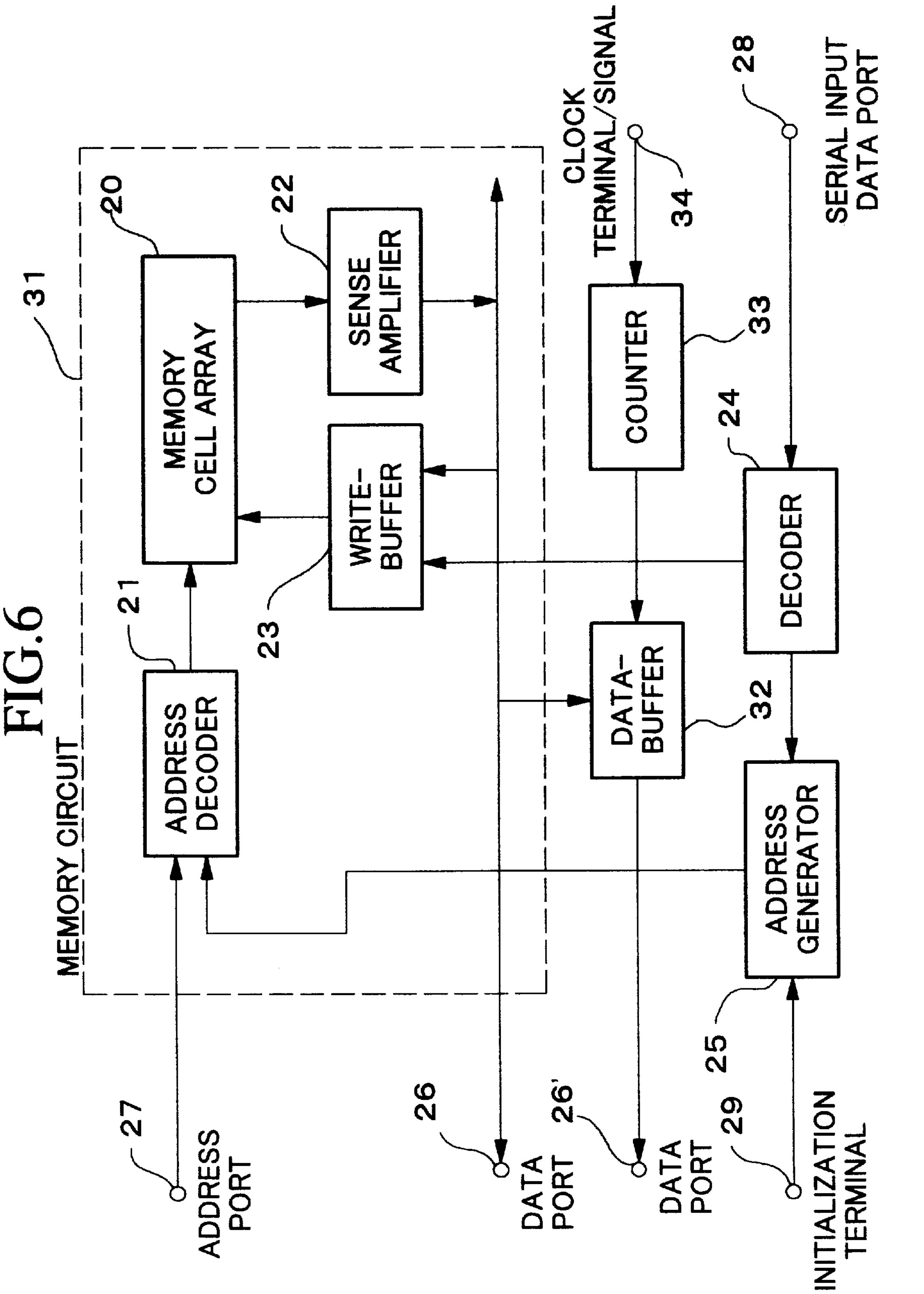
FIG. 6 is a schematic block diagram of the component configuration of still another embodiment of the IC memory.

FIG. 6 shows another component configuration of the IC memory used in the main memory 2 shown in FIG. 5. A data port 26' has been added to the IC memory shown in FIG. 2 for outputting data for image formation. A group of data from the memory cell array 20 are written into the data buffer 32 by way of the sense amplifier 22, and the contents of the data buffer 32 are successively output to the data port 26' at the clock rate of the counter 33 counting by signals input from the clock terminal/signal 34. In FIG. 6, the memory circuit 31 shown by the dotted line boundary indicates a typical structure of the general-purpose memory circuit, and the microprocessor 1 accesses the IC memory is through the address port 27 and the data port 26. Variable-length encoded image signals are input through the data port 28, then decoded in the decoder 24 and written into the memory cell array 20 by way of the write-buffer 23. The write-addresses are generated in the address generator 25, and appropriate memory cells in the memory cell array 20 are selected by way of the address decoder 21. The data ports 26' and 28 are, respectively, a serial output terminal and a serial input terminal, and require only one operational pin, and therefore, only a few additional pins, including those required for control signals such as initialization signals 29, are required to be added to the general-purpose IC.

Figure 7:
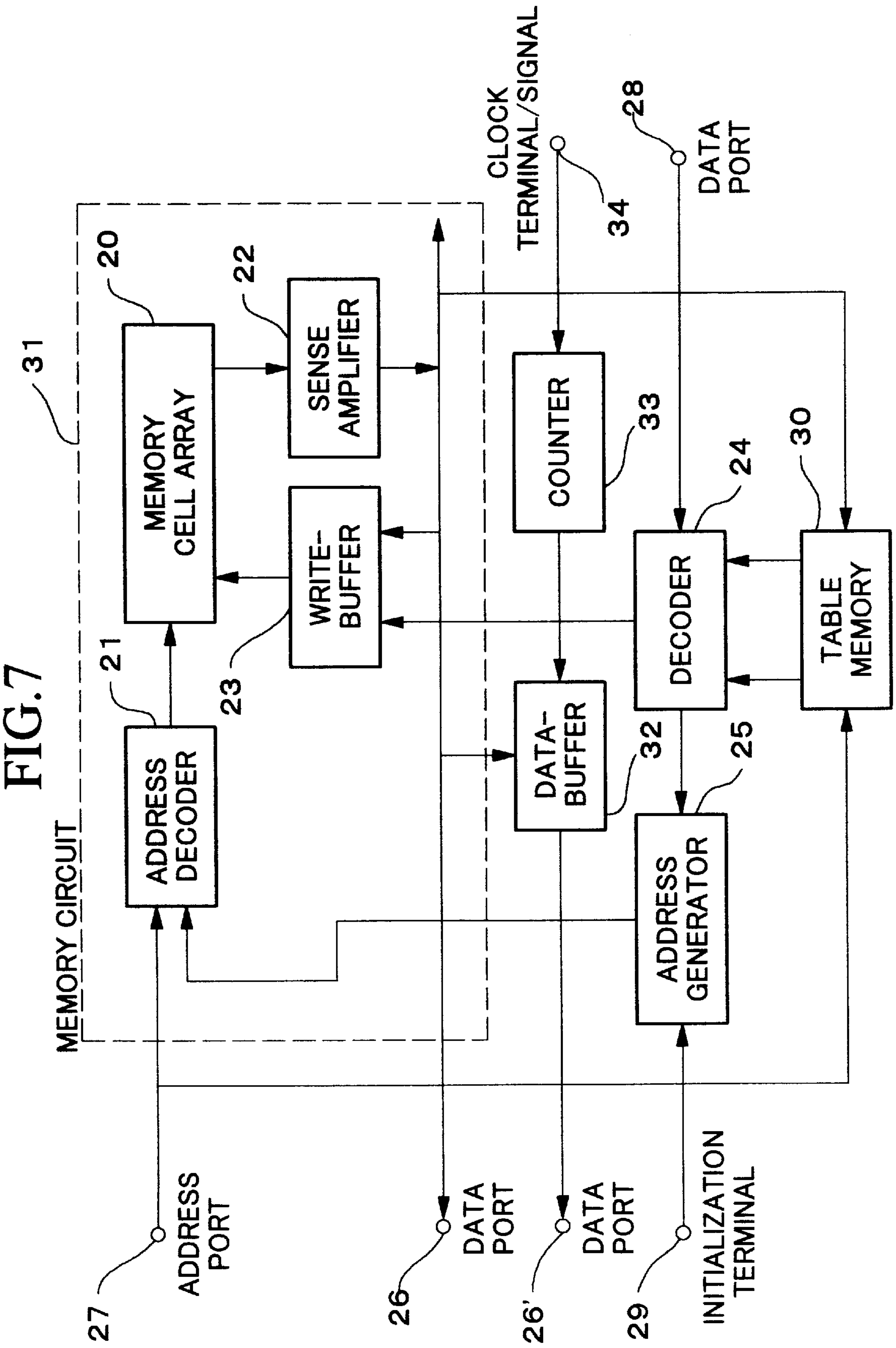
FIG. 7 is a schematic block diagram of the component configuration of still another embodiment of the IC memory.
Figure 8:
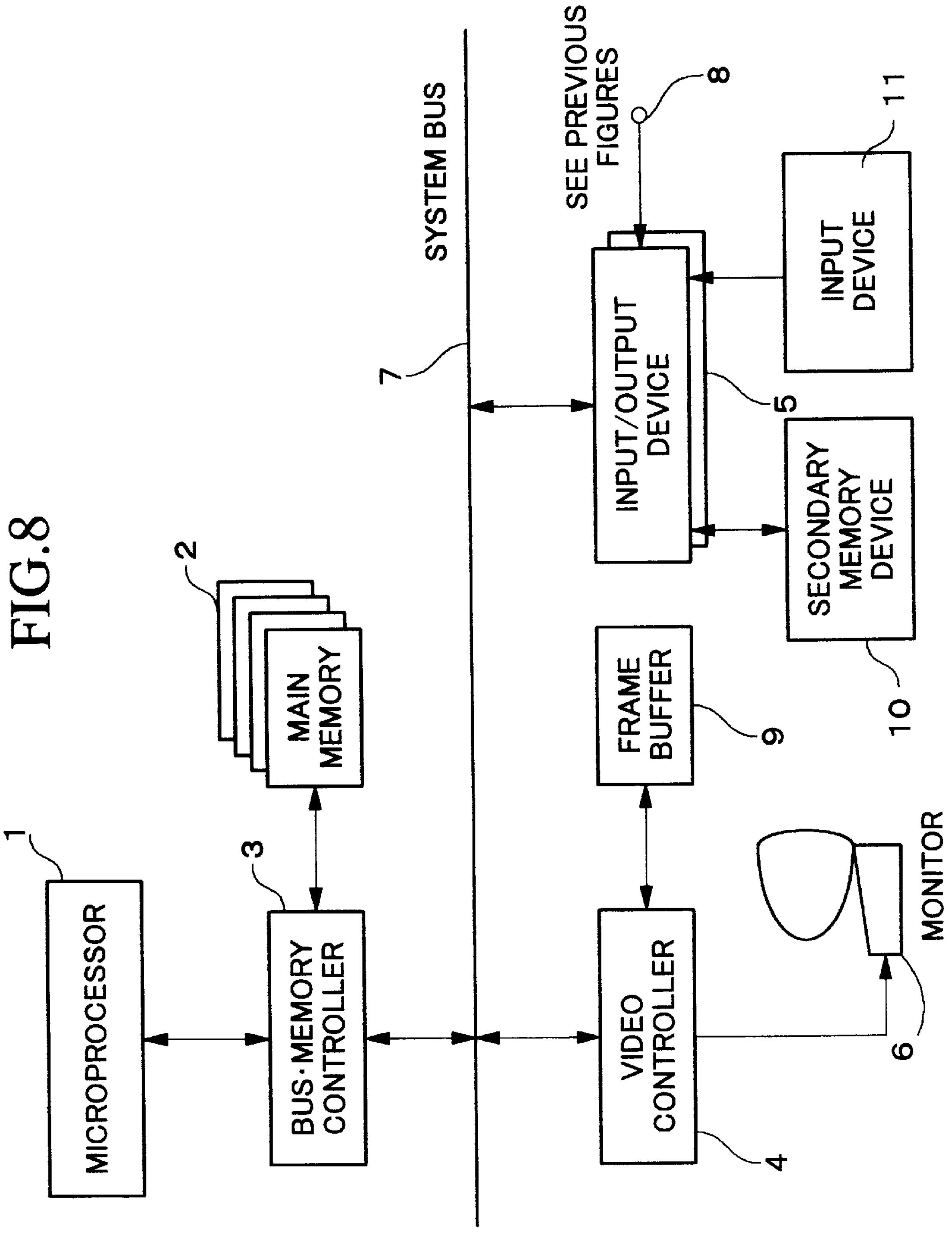
FIG. 8 is a schematic block diagram of the system configuration of a conventional computer system.
Figure 9:
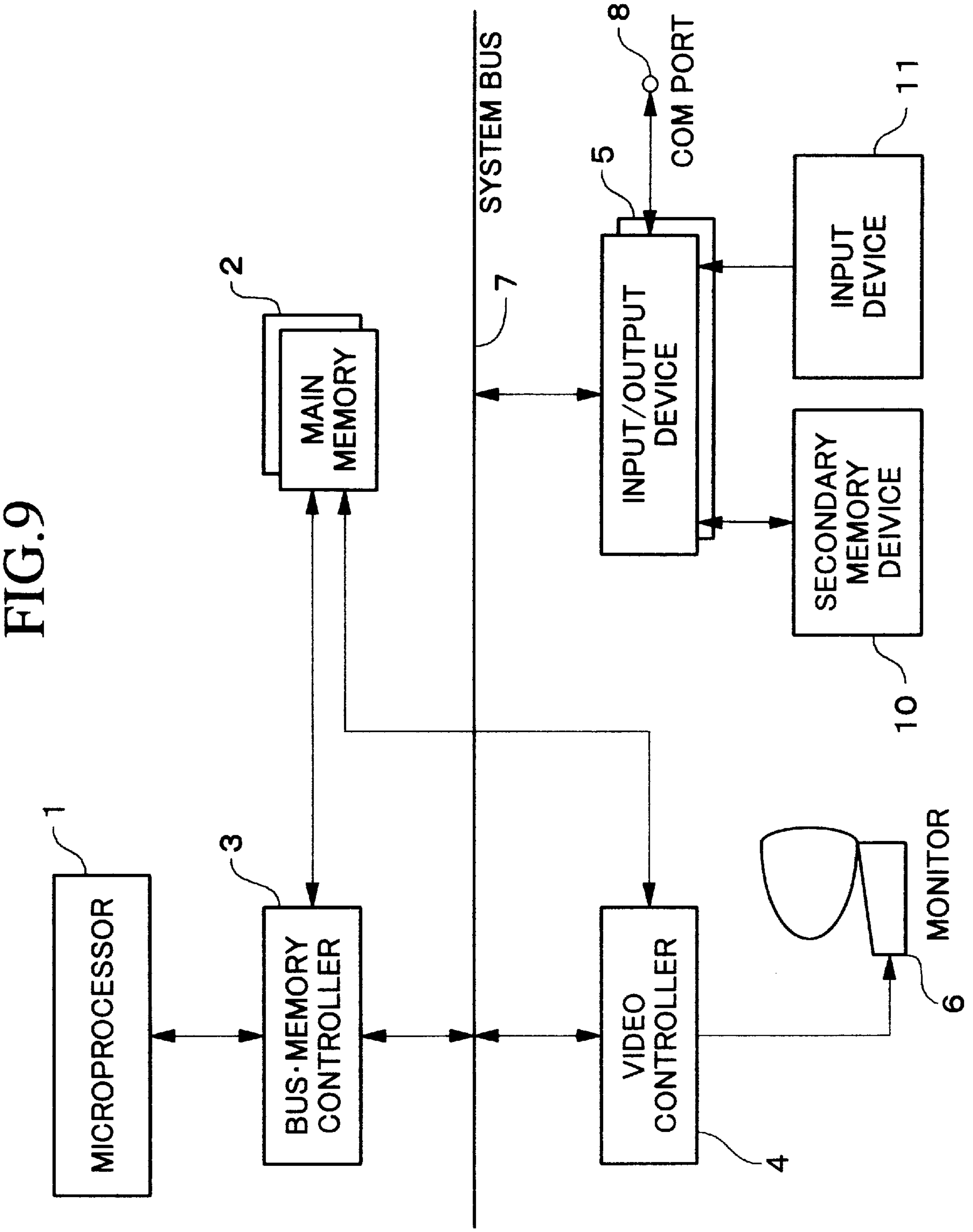
FIG. 9 is a schematic block diagram of the system configuration of another conventional computer system.
Figure 10:
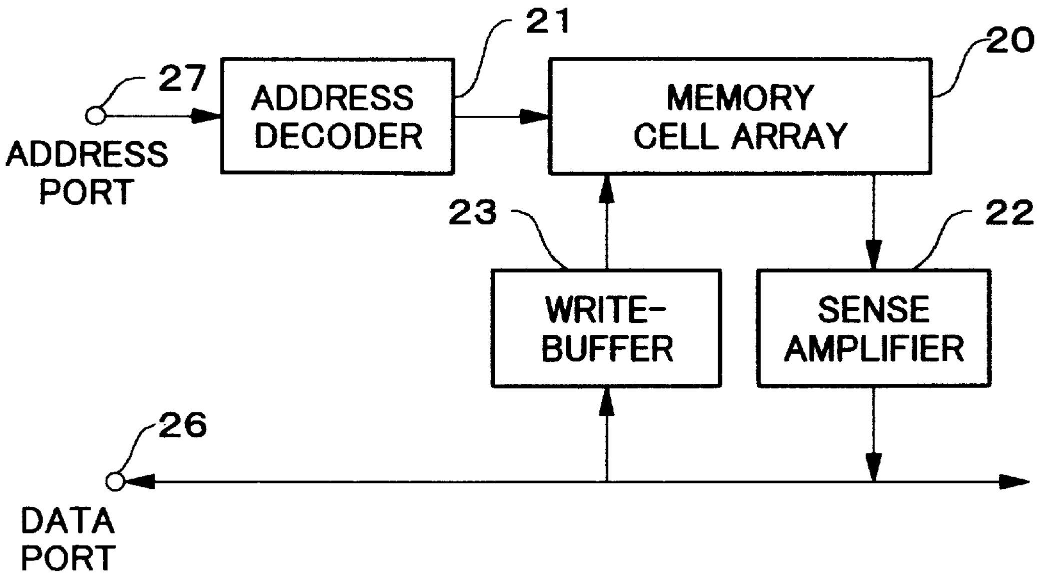
FIG. 10 is a schematic block diagram of the component configuration of a conventional IC memory.
Figure 11:
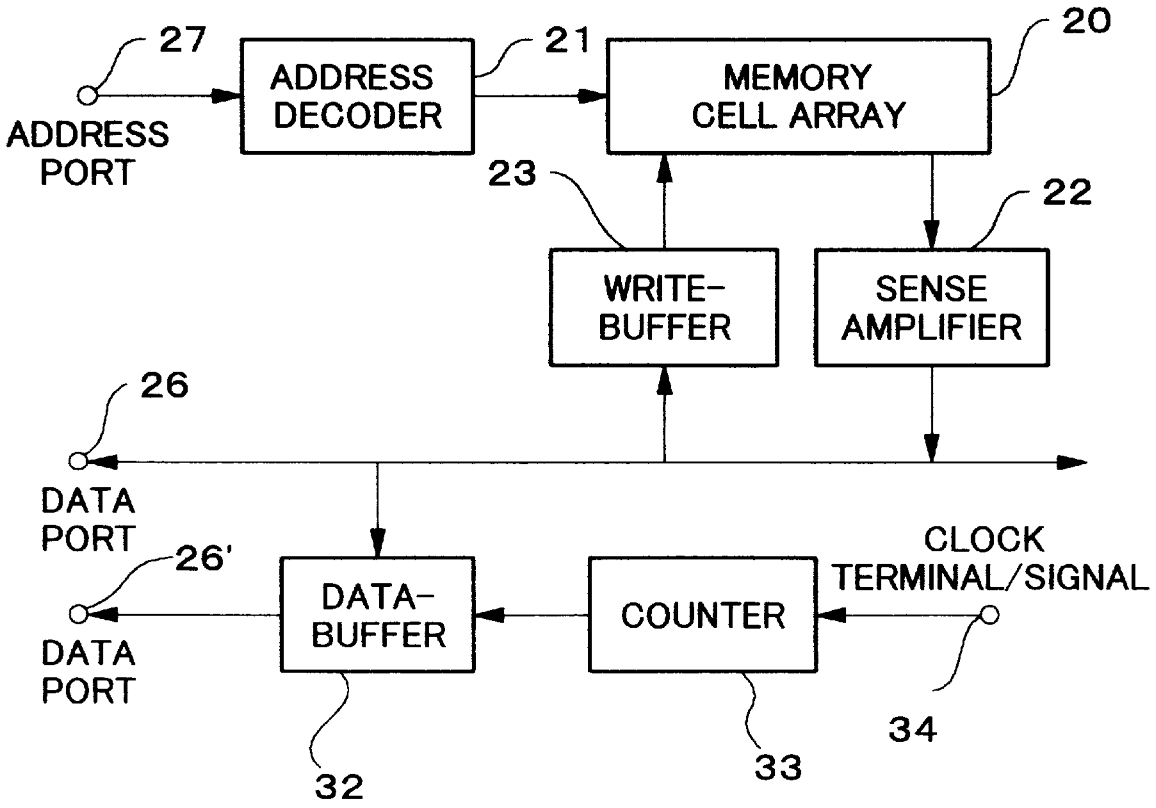
FIG. 11 is a schematic block diagram of the component configuration of still another conventional IC memory.
Figure 12:
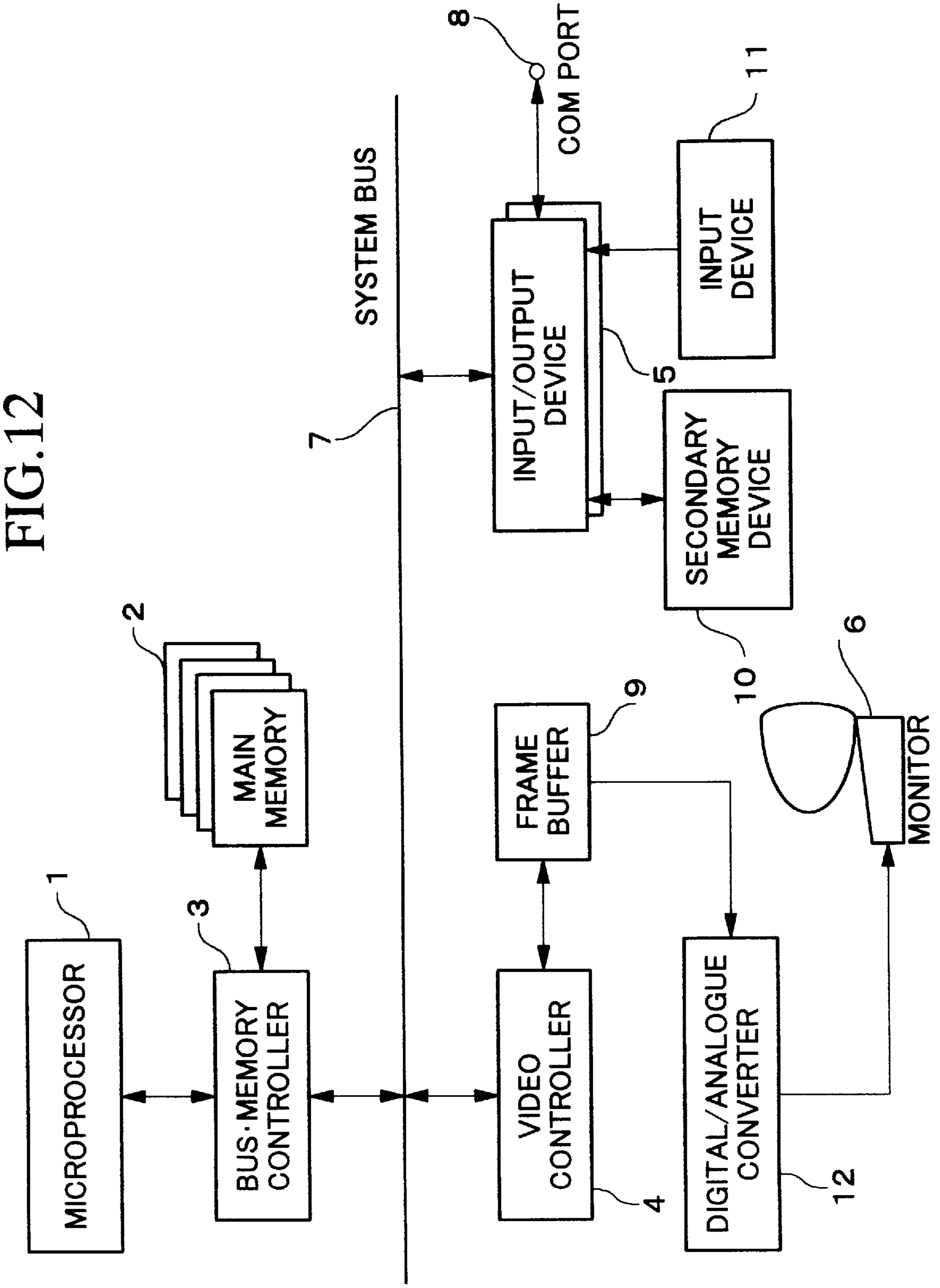
FIG. 12 is a schematic block diagram of the system configuration of still another conventional computer system.
Figure 13:
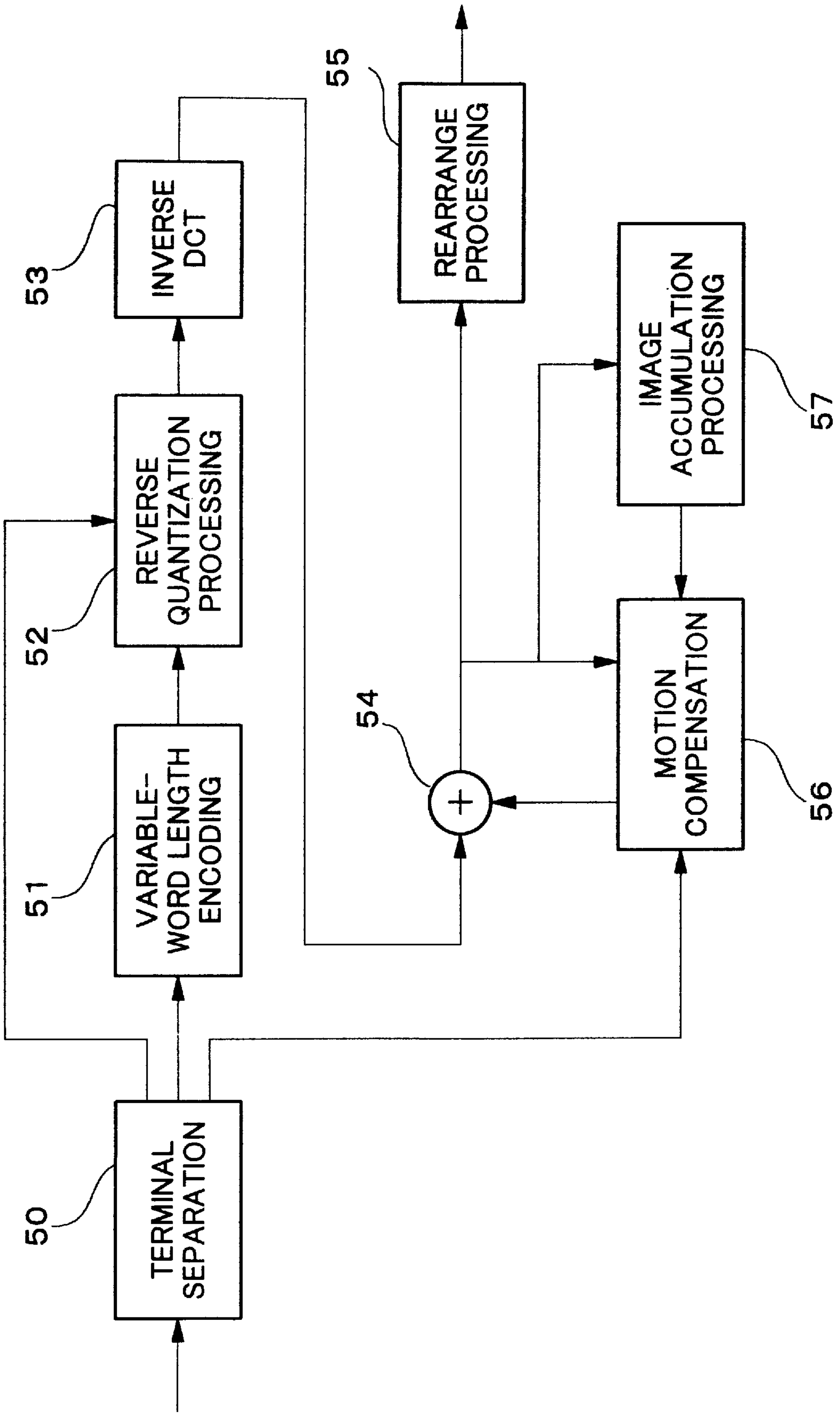
FIG. 13 is a flowchart for processing of compressed image data by a computer system.

FIG. 7 shows an IC memory with an additional table memory 30 provided for the decoder 24. Variable-length encoded image signals input from the data port 28 are input into the decoder 24, and are decoded with reference to the table input into the decoder 24 and stored in the table memory 30. The decoding data are written into the table memory 30 by the microprocessor 1, before the image processing process is commenced.

What is claimed is:

1. A computer system including an integrated circuit memory, having a computational ability, said integrated circuit memory further including:

an address port;

an access port for accessing by a microprocessor;

an input port for inputting data directly from an input/output device, wherein the input from said input port is variable-length encoded; and a decoder for decoding the variable-length encoded input, wherein the variable-length encoded input is decoded with reference to a decoding table and stored.

2. A computer system, including:

a microprocessor connected to an integrated circuit memory having a computational ability, via a bus•memory controller;

a video controller and an input/output device connected to said bus•memory controller via a system bus, wherein said integrated circuit memory further includes:

an address port;

a data port for accessing by said microprocessor;

a port for directly inputting variable-length encoded data signals, wherein the inputted variable-length encoded signals are variable length decoded and stored, and a decoder that variable-length decodes the variable-length encoded signals inputted from said port with reference to a decoding table.

3. A computer system as claimed in claim 2, said integrated circuit memory further includes a monitor port, said monitor port connected to a digital-to-analog converter for outputting processed variable-length encoded data.

4. A computer system including an integrated circuit memory having a computational ability, said integrated circuit memory performing the functions of:

receiving variable-length encoded signals written into said integrated circuit memory via a write port; and variable-length decoding the variable-length encoded data inputted from said write port with a decoder with reference to a decoding table; and storing the decoded data.

5. A computer system as claimed in claim 4, wherein the function of receiving variable-length encoded signals includes initializing an address generator to generate addresses to a memory cell array.

6. A computer system as claimed in claim 4, wherein said integrated circuit memory further performs the functions of:

receiving an address value for said decoding table; and reading the corresponding decoding script from said decoding table to perform a decoding operation.

7. An integrated circuit memory, having a computational ability, including:

an address port;

a first data port for accessing by a microprocessor;

a second data port for inputting variable-length encoded signals, wherein the inputted variable-length encoded signals are variable-length decoded and stored; and a decoder for decoding of variable-length encoded signals, wherein said decoder decodes said variable-length encoded signals with reference to a decoding table.

8. An integrated circuit memory, having a computational ability, including a memory cell array;

an address decoder for decoding memory cell addresses for address data input from an address port;

a sense amplifier for amplifying signals from said memory cell array;

a write-buffer for writing data input from a first data port into said memory cell array, wherein a second data port is provided for inputting variable length encoded signals, and wherein the variable-length encoded signals inputted from said second data port are variable-length decoded and stored in said memory cell array; and a decoder for decoding of variable-length encoded signals, wherein said decoder performs decoding operations with reference to a decoding table stored in said memory cell array.

9. An integrated circuit memory as claimed in claim 8, wherein said memory cell array further includes a frame buffer memory cell array.

10. An integrated circuit memory as claimed in claim 8, further including a data buffer for storing the amplified signals from said memory cell array, wherein a third data port is provided for outputting the stored amplified signals.

11. An integrated circuit memory as claimed in claim 10, further including a counter for successively outputting the stored amplified signals from said data buffer to said third data port, said counter receiving a clock rate signal from a clock signal terminal.

12. An integrated circuit memory as claimed in claim 11, further including a counter for successively outputting the stored amplified signals from said data buffer to said second data port, said counter receiving a clock rate signal from a clock signal terminal.

13. An integrated circuit memory, having a computational ability, including an address port;

a first data port for accessing by a microprocessor;

a second data port for outputting data; and a third data port for inputting variable-length encoded signals, wherein the inputted variable-length encoded signals are variable-length decoded and stored; and a decoder for decoding of variable-length encoded signals, wherein said decoder performs decoding operations with reference to a decoding table.

14. An integrated circuit memory, having a computational ability, including a memory cell array;

an address decoder for decoding memory cell addresses for address data input from an address port;

a sense amplifier for amplifying signals from said memory cell array; and a write buffer for writing data input from a first data port into said memory cell array; wherein a second data port for outputting data and a third data port for inputting variable-length encoded signals are provided, and wherein the inputted variable length encoded signals are variable-length decoded and stored; and a decoder for decoding of variable-length encoded signals, wherein said decoder performs decoding operations with reference to a decoding table stored in said memory cell array.

15. An integrated circuit memory as claimed in claim 14, wherein said memory cell array further includes a frame buffer memory cell array.

16. An integrated circuit memory as claimed in claim 14, further including a data buffer for storing the amplified signals from said memory cell array.

* * * * *